US006074081A

United States Patent [19]

Smith et al.

[11] Patent Number: 6,074,081

[45] **Date of Patent: *Jun. 13, 2000**

[54] APPARATUS AND METHOD FOR PROCESSING SHEET ARTICLES SUCH AS BANK NOTES

[75] Inventors: Paul Smith, Munich; Walter Herrmann, Oberasbach; Bernd Wunderer, Munich; Dieter Stein, Holzkirchen, all of Germany

[73] Assignee: Giesecke & Devrient GmbH, Munich, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/945,795

[22] PCT Filed: May 8, 1996

[86] PCT No.: PCT/EP96/01930

§ 371 Date: Feb. 19, 1998

§ 102(e) Date: Feb. 19, 1998

[87] PCT Pub. No.: WO96/36931

PCT Pub. Date: Nov. 21, 1996

[30] Foreign Application Priority Data

May 11, 1995 [DE] Germany .......................... 195 17 347

[51] Int. Cl.⁷ ...................................................... G06F 17/00

[52] U.S. Cl. ...................................... 364/478.11; 209/534

[58] Field of Search .......................... 364/478.11, 478.12, 364/478.14; 209/534

[56] References Cited

U.S. PATENT DOCUMENTS

| | | | |
|---|---|---|---|
| 4,749,087 | 6/1988 | Buttifant | 209/534 |
| 5,310,036 | 5/1994 | Hell | 209/534 |
| 5,563,393 | 10/1996 | Coutts | 209/534 |
| 5,649,627 | 7/1997 | Wako | 209/534 |

*Primary Examiner*—Christopher P. Ellis
*Assistant Examiner*—Khoi H. Tran
*Attorney, Agent, or Firm*—Bacon & Thomas

[57] ABSTRACT

In an apparatus for testing sheet material, at least one sensor unit is provided with a memory in which data records of a plurality of sheets can be managed. Each data record is provided with areas in which data from at least one other sensor unit can be stored. The sensor unit preferably has a measuring unit and an evaluation unit, the memory of the sensor unit being provided in the evaluation unit.

16 Claims, 11 Drawing Sheets

Figure 1:
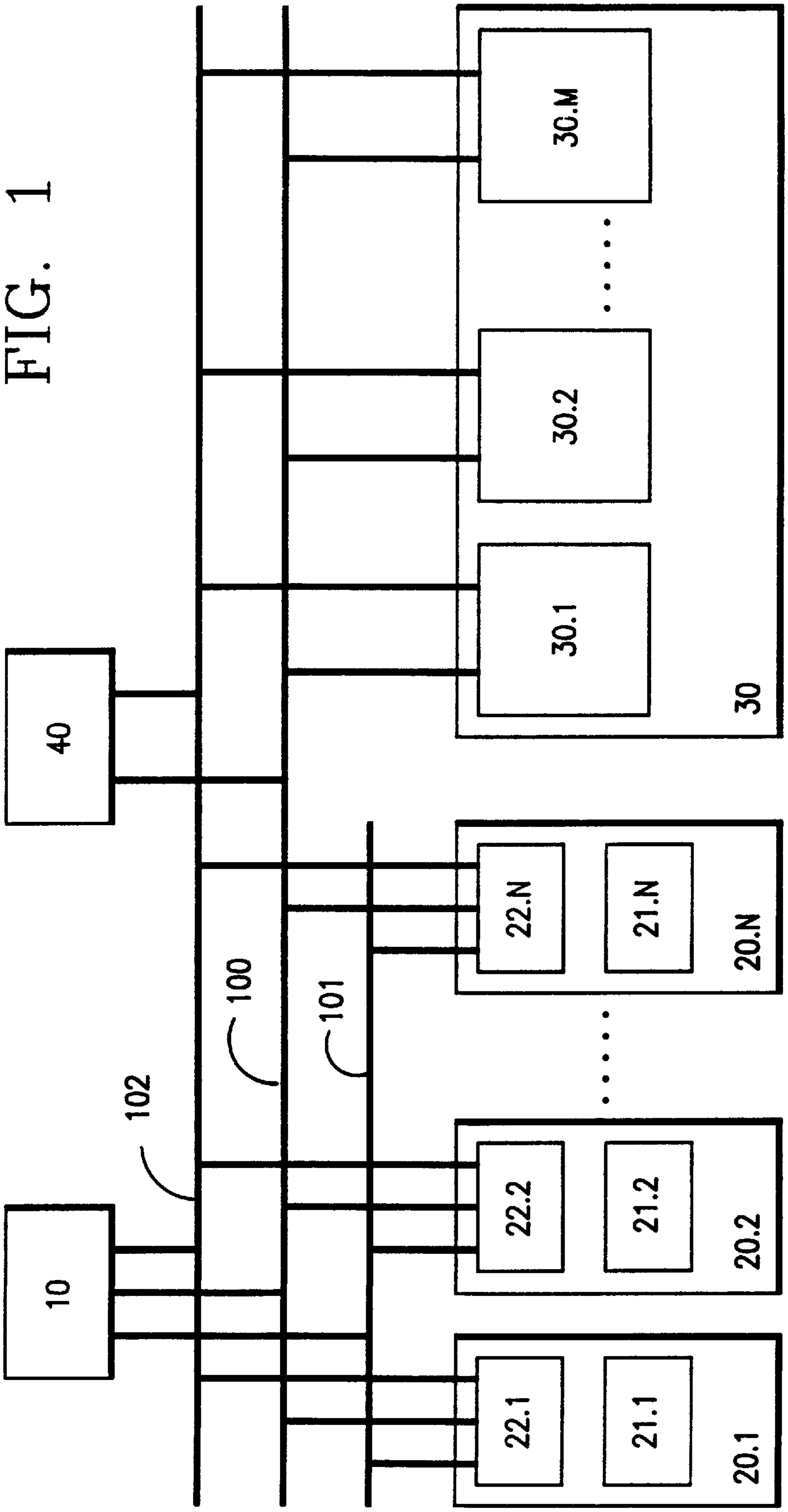

| ID | ME | | | | KL |
|---|---|---|---|---|---|
| | 20.1 | 20.2 | ... | 20.N | |
| 1 | ME.11 | ME.12 | ... | ME.1N | KL.1 |
| 2 | ME.21 | ME.22 | ... | ME.2N | KL.2 |
| 3 | ME.31 | ME.32 | ... | ME.3N | KL.3 |
| 4 | ME.41 | ME.42 | ... | ME.4N | KL.4 |
| .... | .... | .... | .... | .... | .... |
| L | ME.L1 | ME.L2 | ... | ME.LN | KL.L |

10

FIG. 3

| Group | Property | Class | | SL | G | 1 | 2 | 3 | 4 | 5 | V1 | V2 | V3 | V4 |
|---|---|---|---|---|---|---|---|---|---|---|---|---|---|---|
| Mechanical properties of apparatus | Double pull | yes | 1 | 3 | 0 | | | | | | | | | |
| | | no | 0 | 3 | 0 | X | X | X | X | X | X | X | X | X |
| | Disturbance | yes | 1 | 3 | 0 | | | | | | | | | |
| | | not o.k. | 0 | 3 | 0 | X | X | X | X | X | X | X | X | X |
| Mechanical properties of banknote | Length | o.k. | 1 | 2 | 0 | X | X | X | X | X | X | X | X | X |
| | | not o.k. | 0 | 2 | 0 | | | | | | | | | |
| | Orientation | up | 1 | 2 | 0 | X | | X | X | X | | X | | X |
| | | down | 0 | 2 | 0 | | X | X | X | X | X | | X | |
| Denomination of banknote | Denomina-tion | $1 | 1 | 1 | 3 | | | X | X | X | | | X | |
| | | $2 | 2 | 1 | 3 | | | X | X | X | | X | | |
| | | ... | ... | ... | ... | ... | ... | ... | ... | ... | ... | ... | ... | ... |
| | | $50 | 50 | 1 | 8 | X | X | | X | X | X | | | X |
| Security features of banknote | Watermark | o.k. | 1 | 2 | 3 | X | X | X | | X | X | X | X | X |
| | | not o.k. | 0 | 2 | 0 | | | X | X | | | | | |
| | Security thread | o.k. | 1 | 2 | 5 | X | X | X | | X | X | | X | X |
| | | not o.k. | 0 | 2 | 0 | | | | X | | | X | | |
| Dirtiness of banknote | Dirtiness | very clean | 0 | 1 | 0 | X | X | X | X | | | | | X |
| | | clean | 1 | 1 | 0 | X | X | X | X | | X | X | | |
| | | ... | ... | ... | ... | ... | ... | ... | ... | ... | ... | ... | ... | ... |
| | | Dirty | 14 | 1 | 0 | | | | | X | | | X | |
| | | Very Dirty | 15 | 1 | 0 | | | | | X | | | | |
| Defects of banknote | Dog-ears | very few | 0 | 1 | 0 | X | X | X | X | X | X | | | |
| | | few | 1 | 1 | 0 | X | X | X | X | X | | X | X | |
| | | ... | ... | ... | ... | ... | ... | ... | ... | ... | ... | ... | ... | ... |
| | | many | 14 | 1 | 0 | | | | | X | | | | X |
| | | very many | 15 | 1 | 0 | | | | | X | | | | |
| | stains | very few | 0 | 1 | 0 | X | X | X | X | X | | | | X |
| | | few | 1 | 1 | 0 | X | X | X | X | X | X | X | | |
| | | ... | ... | ... | ... | ... | ... | ... | ... | ... | ... | ... | ... | ... |
| | | many | 14 | 1 | 0 | | | | | X | | | X | |
| | | very many | 15 | 1 | 0 | | | | | X | | | | |
| | | | | | Sort Class | Stacker 1 | Stacker 2 | Stacker 3 | Stacker 4 | Shredder | | | | |

FIG. 6

| Old sort class | Condition | New sort class |
|---|---|---|
| Stacker 2 | IF[MG(Security features of banknote)<=5]THEN | Reject |
| Stacker 1 | IF[Measuring result(stains)>=140]THEN | Shredder |
| Stacker 2 | IF[Class code(Dirtiness)]>=12]THEN | Reject |
| Shredder | IF[RND(0,1)>=0.8]THEN | Reject |
| Stacker 3 | IF[Class code(Disturbance)=1]THEN | Stacker 2 |

FIG. 7

| No | Dirtiness | | Dog-ears | | Stains | | Sorting | |
|---|---|---|---|---|---|---|---|---|
| | $M_1$ | $M_2$ | $M_1$ | $M_2$ | $M_1$ | $M_2$ | $M_1$ | $M_2$ |
| 1 | Low | | Many | | Few | | Reject | |
| | 0.9 | 0.4 | 0.7 | 0.8 | 0.8 | 0.9 | 0.7 | 0.4 |
| 2 | Medium | | Many | | Few | | Shredder | |
| | 0.1 | 0.6 | 0.7 | 0.8 | 0.8 | 0.9 | 0.1 | 0.6 |
| 3 | Low | | Medium | | Few | | Stacker | |
| | 0.9 | 0.4 | 0.3 | 0.2 | 0.8 | 0.9 | 0.3 | 0.2 |
| 4 | Medium | | Medium | | Few | | Shredder | |
| | 0.1 | 0.6 | 0.3 | 0.2 | 0.8 | 0.9 | 0.1 | 0.2 |
| 5 | Low | | Many | | Medium | | Reject | |
| | 0.9 | 0.4 | 0.7 | 0.8 | 0.2 | 0.1 | 0.2 | 0.1 |
| 6 | Medium | | Many | | Medium | | Shredder | |
| | 0.1 | 0.6 | 0.7 | 0.8 | 0.2 | 0.1 | 0.1 | 0.1 |
| 7 | Low | | Medium | | Medium | | Stacker | |
| | 0.9 | 0.4 | 0.3 | 0.2 | 0.2 | 0.1 | 0.2 | 0.1 |
| 8 | Medium | | Medium | | Medium | | Shredder | |
| | 0.1 | 0.6 | 0.3 | 0.2 | 0.2 | 0.1 | 0.1 | 0.1 |

FIG. 10

APPARATUS AND METHOD FOR PROCESSING SHEET ARTICLES SUCH AS BANK NOTES

This invention relates to an apparatus and method for processing sheet material such as bank notes.

DE 27 60 166 shows such an apparatus which is constructed from different units. In a singler the sheet material present in a stack is singled sheet for sheet and delivered to a transport path which transports the singled sheet material through the apparatus.

Along the transport path a plurality of sensor units are mounted, each sensor unit detecting certain features of the sheet material and combining them into a measuring result. The structure of the sensor units used here is shown in DE-PS 27 60 165. Each sensor unit has a transducer which detects certain features of the sheet material and converts them into an electric signal. This signal is transformed in a signal processing stage. The usually analog signal is generally converted into digital measuring data here. The measuring data are finally transformed into yes-or-no information in an evaluation unit of the sensor unit. This information constitutes the sensor unit's measuring result and is stored in a main memory.

The main memory is used as a connection for data exchange between the units of the apparatus. It can be accessed by all units which write or read the data necessary for processing the sheet material. In the main memory one data record is stored for several sheets in each case.

From the sensor units' measuring results stored in the main memory for each sheet material, evaluation information is first produced in a central evaluation unit. A decision table stored in the evaluation unit is used to determine from the evaluation information the destination units for the relevant sheet material.

The destination units can be for example stackers for stacking the sheet material or shredders for destroying the sheet material. The destination units for the corresponding sheet material are stored in the main memory. With reference to the stored destination unit the sheet material is accordingly guided and deposited by the transport unit. After transport of the sheet material to the destination unit the transport unit writes positive or negative information about the outcome of processing in the main memory.

The processing operation in the apparatus is controlled by a control unit. This unit also accesses the main memory and can monitor and log the processing operation with reference to the information deposited there. Further, the control unit serves to initialize the units of the apparatus in accordance with an operating mode adjusted by the operator. This includes for example storing the correct decision table for the selected operating mode in the central evaluation unit.

In the known system each sensor unit can derive its measuring result only from the sheet material measuring data received by it.

On these premises, the invention is based on the problem of proposing an apparatus for processing sheet material which permits the quality of derivation of the sensor units' measuring result to be improved.

The basic idea of the invention is substantially to derive a sensor unit's measuring result using data from other sensor units about the corresponding sheet material. For this purpose at least one sensor unit is provided with a memory in which data records of a plurality of sheets can be managed. Each of these data records is provided with areas in which data from at least one other sensor unit can be stored.

The advantage of the invention is that the sensor unit has data from other sensor units available which it can take into account when deriving its own measuring result. Knowledge of these data enables the sensor unit to derive its measuring result from these data faster and more exactly.

The sensor unit preferably has a measuring unit and an evaluation unit, the memory of the sensor unit being provided in the evaluation unit. Further, the measuring results of the sensor unit are not restricted to yes-or-no information but equipped with a higher information content. The measuring results can be for example the length or width of the sheet material in millimeters, a dimension figure for dirtiness, the agreement of the printed image with a reference image, the distance of a metal thread from the leading edge of the sheet material, an identification number for the type or position of the sheet material, or the like.

Figure 2:
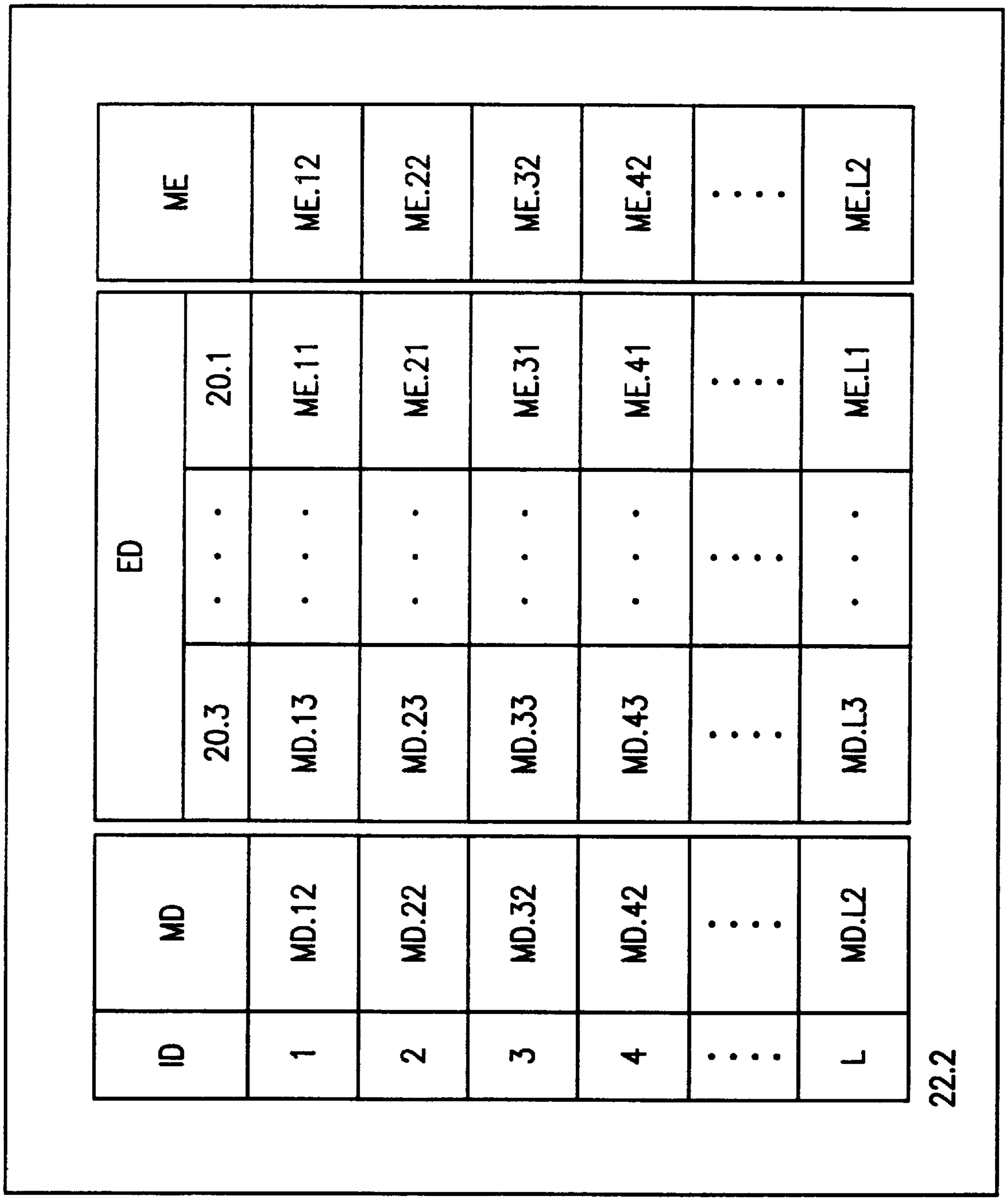
Figure 4:
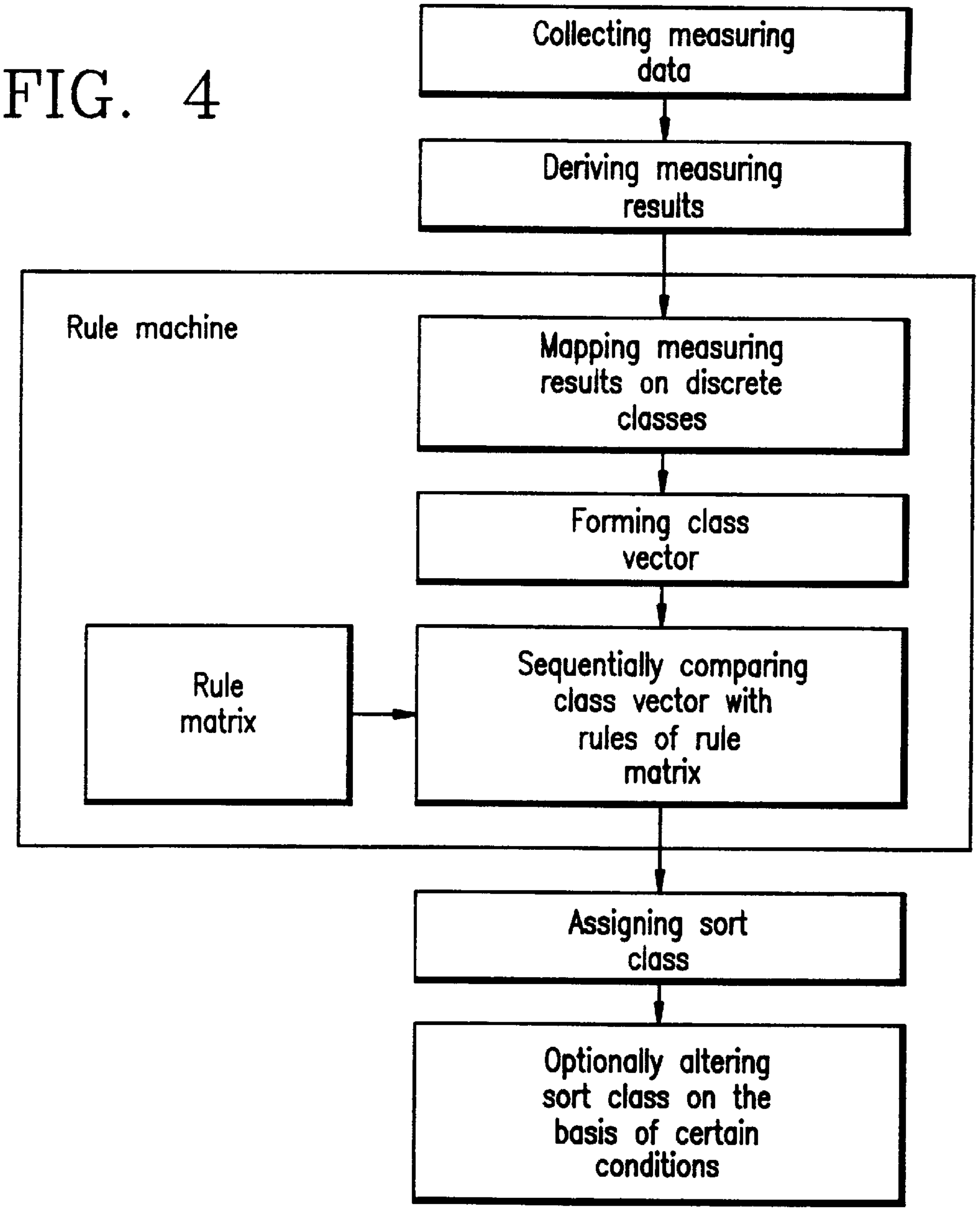
Figure 5:
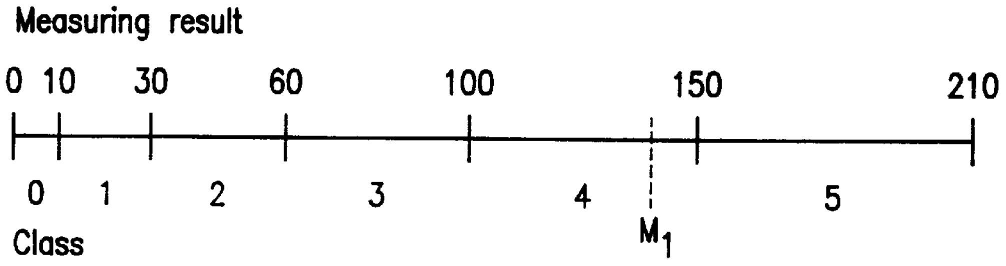
Figure 8:
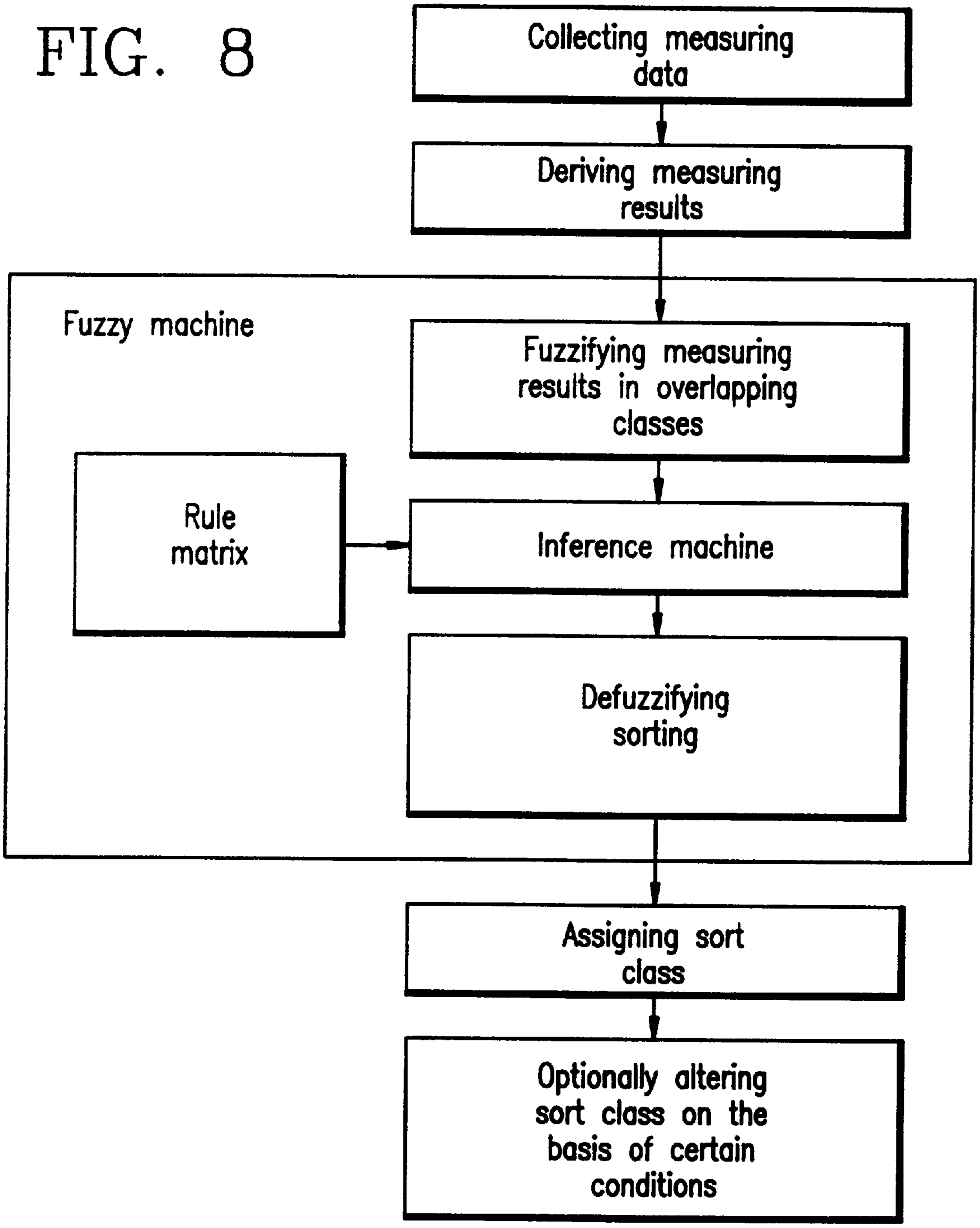
Figure 9A:
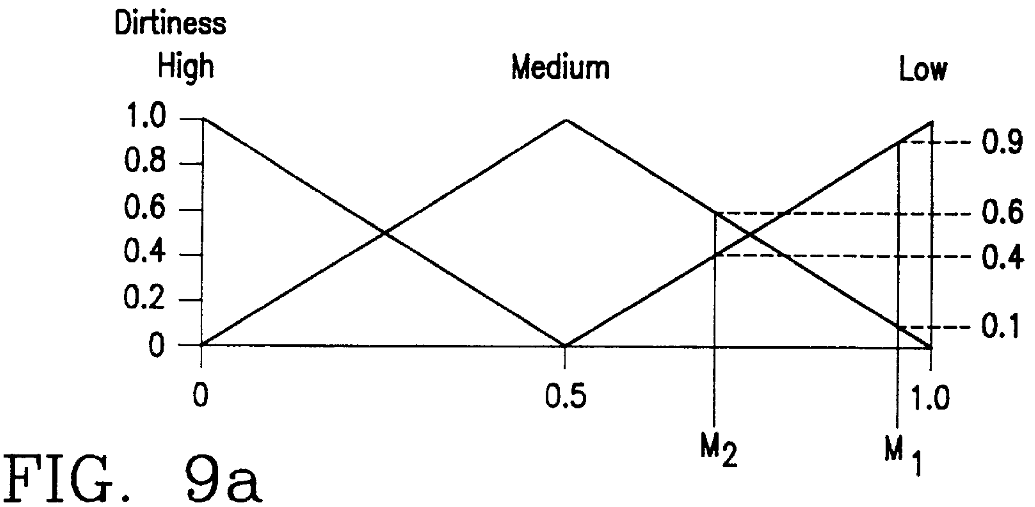
Figure 9B:
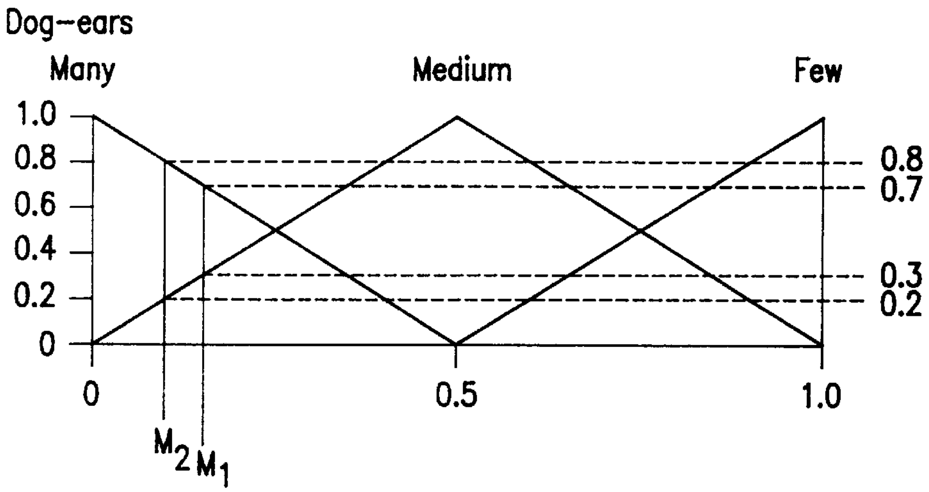
Figure 9C:
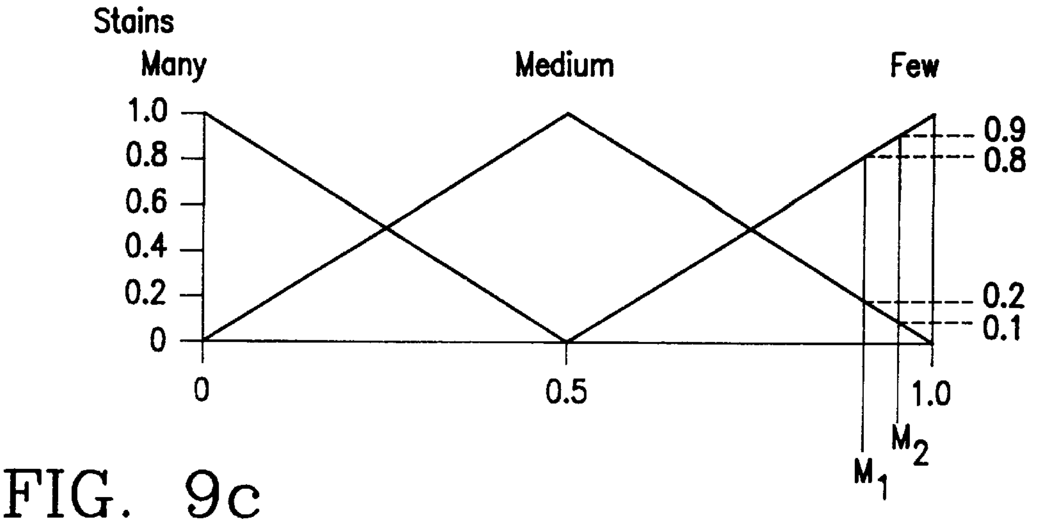
Figure 11:
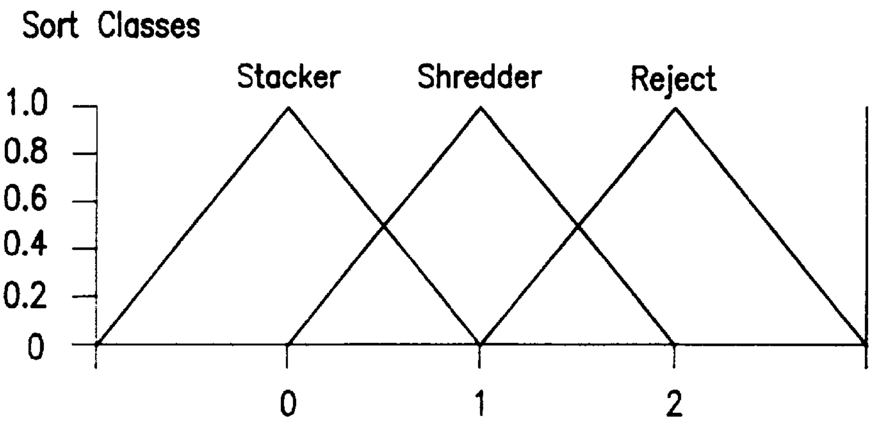

Further features and advantages of the invention can be found with reference to the figures, in which:

FIG. 1 shows a schematic diagram of an embodiment of the invention,

FIG. 2 shows a representation of the memory content in the evaluation unit of a sensor, FIG. 3 shows a representation of the memory content in the central evaluation unit, FIG. 4 shows a flow chart of a first embodiment of the inventive method, FIG. 5 shows a representation of the mapping of the measuring results on discrete classes, FIG. 6 shows a representation of the rule matrix of the first embodiment, FIG. 7 shows a representation of the alteration conditions for sort classes, FIG. 8 shows a flow chart of a second embodiment of the incentive method, FIG. 9 shows a representation of the mapping of the measuring results on overlapping classes with affiliation functions, FIG. 10 shows a representation of the rule matrix of the second embodiment, FIG. 11 shows a representation of the affiliation functions of the sort classes, FIG. 12 shows a graphic derivation of a resulting affiliation function of a sort class, FIG. 13 shows a representation of the resulting affiliation functions.

FIG. 1 shows a schematic diagram of an embodiment of the invention. The sheet material is singled sheet for sheet from a stack in a singling unit and delivered to a transport path which transports the sheets through the apparatus and is controlled by transport unit 30. The transport path is divided into individual portions each controlled by decentralized subunits 30.1–30.M of transport unit 30.

During singling each sheet is assigned identification ID permitting the sheet to be clearly recognized by the units of the apparatus. The data required for processing a sheet are exchanged using identification ID of the sheet via connection 100. Connection 100 interconnects both subunits 30.1–30.M and central evaluation unit 10, a plurality of sensor units 20.1–20.N and control unit 40.

Sensor units 20.1–20.N are each composed of measuring unit 21.1–21.N and evaluation unit 22.1–22.N. Each measuring unit 21.n has a transducer which detects certain features of the sheet material and converts them into electric signals. These electric signals are then converted into digital measuring data and can optionally be standardized and/or transformed before further processing. Evaluation unit 22.n of sensor 20.n receives the measuring data of measuring unit 21.n and uses the measuring data to derive a measuring result.

At least one evaluation unit 22.n is provided with a memory whose content is shown in FIG. 2. Evaluation unit 22.2 was selected as an example here. In the memory of evaluation unit 22.2 a plurality of data records can be managed. Each data record is assigned to a sheet with certain identification ID. The memory shown here is in a position to manage number L of data records.

Each data record has an area for external data ED. Either measuring data MD or measuring results ME from other sensor units are stored therein. In FIG. 2, for example, measuring data MD from sensor unit 20.3 and the measuring results from sensor unit 20.1 are stored in each data record. For example, the measuring data from sensor unit 20.3 for the sheet with identification ID=2 are designated here as MD.23, the first index corresponding to bank note identification ID=2 and the second index to the sensor unit index=3. The other data are designated analogously.

Measuring data MD delivered by measuring unit 21.2 are preferably also stored in the memory of evaluation unit 22.2 for each sheet. Evaluation unit 22.2 derives from its own measuring data MD and external data ED of a data record corresponding measuring result ME for each sheet, which can optionally be stored in the corresponding data record.

When the measuring result for a sheet is determined, it is written with corresponding identification ID of the sheet to data line 100. If required, the measuring result can now be read by other sensor units and stored in the evaluation unit memory of this sensor unit. If knowledge of certain measuring data from one sensor is necessary for deriving the measuring result of another sensor unit, it must write the corresponding measuring data to data line 100 so that the other sensor unit can read them. Alternatively, the measuring data can be written only after a corresponding signal has been received from the other sensor unit.

Further, the apparatus has central evaluation unit 10 with a memory whose content is shown in FIG. 3. Central evaluation unit 10 reads the measuring results of all sensor units 20.1–20.N from data line 100 and stores them under identification ID of the corresponding sheet. When the measuring results of all sensor units are known for identification ID, central evaluation unit 10 derives from the measuring results sort class KL for the corresponding sheet material and writes identification ID and affiliated sort class KL to data line 100. Sort class KL can optionally be stored in the memory under the corresponding identification of the sheet.

Sort class KL is evaluated by the subunits of the transport unit which control the transport of the sheet to the destination unit. If corresponding subunit 30.m is not responsible for processing the sheet the latter is passed on to following subunit 30.m+1. Otherwise, the sheet is guided to the corresponding manipulators of subunit 30.m and processed. After processing the sheet material the processing unit writes corresponding positive or negative information about the outcome of processing to data line 100. This information is read for example by control unit 40 and used for logging the processing operation.

Further, each subunit 30.m can write error messages to the data line if for example a sheet jam occurs in the transport system of subunit 30.m. These error messages can be interpreted by other units of the apparatus and suitable measures initiated.

Subunits 30.m are preferably designed so as to control the electric and mechanical functions of the transport path. This includes, among other things, driving the transport path, operating the switches within the transport path, measuring the position of the sheet material by means of light barriers, etc. Further, subunits 30.m can also control special electric or mechanical manipulators within the units of the apparatus. This includes for example controlling the singler components, the stacking wheels and the shredder rolls, etc.

Control unit 40 serves to control and log the processing operations on the sheets. It is in a position to send via data line 100 control information which is accordingly interpreted by the individual units. Such control information can be used for example to put the apparatus in a processing status selected by the operator. Further, control unit 40 can cause special programs or reference data from control unit 40 to be stored in the other units of the apparatus via data line 100. For this purpose control unit 40 has mass memories in which these data are managed.

Control unit 40 can monitor and log the processing operation on each individual sheet using the data from subunits 30.1–30.M, sensor units 20.1–20.N and sort class SL of central evaluation unit 10. During the actual processing of the sheet material the function of the control unit is confined to monitoring data line 100.

Data line 100 is executed as a data bus. A CAN bus is preferably used. This is especially well suited for so-called real-time applications as are mainly present here. Further data lines 101, 102 can optionally be provided in parallel to data line 100 so as to relieve data line 100.

Data line 101 can also be realized by means of a CAN bus and serves to improve the data exchange between sensor units 20.1–20.N and central evaluation unit 10. This is useful in particular when many measuring data, which often have a high data volume, are exchanged between sensor units 20.n.

Data line 102 is used specifically by control unit 40 for so-called non-real-time applications. This can involve for example writing extensive programs or reference data to sensor units 20 or central evaluation unit 10 during initialization of the apparatus to a certain operating state. A connection to subunits 30.m can also be dispensed with since the amounts of data transferred thereto are generally small.

The sort class of a sheet can be derived from the measuring results of the sensor units for example using freely configurable tables and/or matrixes which are managed in a memory of central evaluation unit 10. During derivation, continuous measuring results are first mapped on classes. Discrete measuring results are assigned directly to a class. Individual classes are combined into a property of the sheet with different forms. A rule matrix can be used to associate arbitrary but firmly selected combinations of different forms of a quantity of properties with a sort class.

FIG. 4 shows a flow chart of a first embodiment of the inventive method for processing sheet material, specifically bank notes here. Measuring data MD of the bank note are collected by sensors 20.n. Measuring data MD are used to derive measuring results ME of the bank note which are stored in evaluation unit 10 according to FIG. 3.

In the first embodiment, measuring results ME are first mapped on discrete classes. An example of such mapping is shown in FIG. 5. The measuring result is in this case to represent the area of the bank note in square millimeters which is covered by stains. If the measuring result determined in first measurement $M_1$ is 140 $mm^2$ for example, this measuring result is mapped on the class with class code 4. The number of classes and the position of the class limits can be configured at will. Classes 0 to 5 can be combined into the property "stains". Each class thus represents a form of the property "stains". For clarity's sake the individual classes are also often provided with verbal designations such as "very few", "few", "many", etc.

FIG. 6 shows the rule matrix of the first embodiment. For the individual properties "double pull", "disturbance", etc., the corresponding classes are each stated with the verbal and the class codes. For clarity's sake different properties are combined into higher groups.

For deriving the sort class of the bank note, a property vector is first formed from the classes of all properties. FIG. 6 shows by way of example four class vectors $V_1$ to $V_4$. In each property precisely the class corresponding to the particular measuring result of the bank note is marked. For the property "stains" the measuring result of the sheet material belonging to class vector $V_1$ is e.g. in the class "few" while the measuring result of the property "dog-ears" is in the class "very few". The class vector thus classifies the form of all properties of a bank note.

The rule matrix consists of a number of rules designated here with numerals 1 to 5. Each rule consists of a rule vector formed from the classes of all properties analogously to the class vector. In contrast to the class vector, however, it is possible for a plurality of classes of a property to be marked, for example for the property "dirtiness" in rules 1 to 5. Each of rules 1 to 5 has a sort class associated therewith, designated here by the particular sorting destination "stacker 1", "stacker 2", etc. In general the same sort class can be assigned to a plurality of rules.

The statements of the individual rules can be formulated verbally roughly as follows. According to rule 1 the sort class "stacker 1" is assigned to those bank notes whose denomination is $50, which are oriented upward, have all security features, are clean and have very few defects. According to rule 2 the sort class "stacker 2" is assigned to those bank notes whose orientation is downward and which otherwise have the same properties as the bank notes according to rule 1. The sort class "stacker 3" is assigned to all $1 and $2 bank notes which have at least a correct security thread, are clean and have few defects. The sort class "stacker 4" is assigned to those bank notes which, regardless of denomination, are clean, have few defects, and for which neither the property "watermark" nor the property "security thread" is correct. The sort class "shredder" is assigned to all bank notes which, regardless of denomination and defects, have correct security features and are dirty.

For deriving the sort classes, the markings of the class vector, e.g. $V_1$, are now compared with the corresponding markings of rule vectors 1, 2, 3, 4, 5 successively in their order. The sort class assigned to the first rule vector marked in all classes of the class vector is assigned to the sheet material as the sort class. If the markings of no rule vector match all markings of the class vector, the sheet material is assigned an arbitrary but firmly selected sort class.

For the examples in FIG. 6 this means that the sheet material for class vector $V_1$ is assigned the sort class "stacker 2". The sheet material for class vector $V_2$ is assigned the sort class "stacker 4". The sheet material for class vector $V_3$ is assigned the sort class "shredder". Since the marking of no rule vector matches all markings of class vector $V_4$ this sheet material is assigned an arbitrary but firmly selected sort class, to be designated "reject".

After the sheet material is assigned the sort class it is transported to the corresponding destination unit with reference to the sort class. The sheets with the sort class "reject" are generally stacked in a so-called reject compartment, where they can be taken out of the apparatus and inspected by the operator.

In order to prevent unauthorized alteration of the rules of the rule matrix, each class has security level SL assigned thereto. This can be used to specify which users may make alterations in this class. For example, the value 3 stands for the developer of the apparatus, 2 for the supervisor and 1 for the operator. This permits the operator of the apparatus to alter the classes of the property "denomination of bank note", while the properties of the group "security features of bank note" may only be altered by the supervisor.

Further, it is possible to associate weight G with at least certain classes. Weights G can be used for example to check the rules of the rule matrix for consistency or alter the sort class derived by the rule matrix if required.

By way of example, merely one possible meaning for weights G of the classes of the group "security features of bank note" will be explained here. Besides the two properties "watermark" and "security thread" shown here, there are generally a number of other properties in this group which are omitted here for reasons of clarity.

For judging a bank note it may be of interest not only to check the individual properties of the security features but additionally to perform a weighting of the individual properties relative to each other in order to distinguish informative properties from less informative ones for example. Here, for example, the correctness of the property "security thread" is rated higher (as 5) than the correctness of the property "watermark" (3). With a plurality of such properties a fine mutual gradation of the individual properties can be performed by corresponding weights.

From the weights of the individual classes in the group "security features of bank note" one can now determine a minimum weight for each rule by adding up the weights of the individual classes of each property of the group with the lowest marked weight of the rule. This means for the example in FIG. 6 that rules 1, 2 and 5 in the group "security features of bank note" are each assigned a minimum weight of 8. For rule 3 the minimum weight is 5 and for rule 4 the minimum weight is 0.

The thus determined minimum weight for each rule in the group "security features of bank note" thus provides a measure of the security of the bank note. A high minimum weight stands for high security and a low minimum weight for low security. For a bank note fit for circulation the desired security can thus be defined by a given minimum weight in the group "security features of bank note".

From the weights of the property "denomination" such a given minimum weight for the security of a bank note fit for circulation shall be determined here. The given minimum weight of a rule in the group "security features of bank note" for bank notes fit for circulation results as the maximum of the weights of the marked classes of the rule in the property "denomination". For rules 1, 2, 4 and 5 one thus obtains a minimum weight for the security of a bank note fit for circulation of 8 and for rule 3 of 3.

Comparison of the given minimum weight for the security of a bank note fit for circulation according to the property "denomination" with the weight in the group "security features of bank note" for each rule shows that the minimum weights for the security of a bank note fit for circulation are greater for rules 1, 2, 3 and 5 than the minimum weights in the group "security features of bank note". The relation and thus the criterion for a bank note fit for circulation is missed only in rule 4. These criteria can be used for example to check the consistency of each rule.

Introducing a minimum weight for each rule in the group "security features of bank note" provides a criterion which also permits bank notes with different security features to be compared with each other. If required one can of course also use other evaluation algorithms for the individual weights of the classes.

As shown in FIG. 7, the sort class determined with the aid of the rule matrix can optionally be altered afterwards in accordance with a certain condition. Such a subsequent alteration can be helpful for example for servicing the apparatus or designing the rule matrix.

The conditions can be derived from the rule matrix, for example minimum weight MG for a rule in the group "security features of bank note". Further, the conditions can also depend on the sensors' measuring results or the class code of a certain measuring result. One can generally use all data available to the evaluation device in any combination in a condition.

Further, it is possible to divert certain bank notes in statistical distribution by means of random generator RND. In the example shown in FIG. 7, 20% of the bank notes are deflected statistically from the sort class "shredder" to the sort class "reject". Such a procedure makes it possible for example to check the sorting quality of the bank notes continuously if the operator of the apparatus personally inspects the bank notes diverted with the sort class "reject". He can then suitably alter the class limits of certain classes on the basis of his inspection if necessary.

Further, subsequently altering the sort class makes it readily possible to divert the corresponding bank notes in the case of a disturbance without having to make any great changes in the rule matrix.

A second embodiment of the inventive method for processing sheet material is shown in FIG. 8. Here, too, as explained above in the first embodiment, measuring data are first collected by sensors 20.n and measuring data MD used to derive measuring results ME.

In contrast to the first embodiment, measuring results ME are mapped on overlapping classes or fuzzified here. An example of such mapping is shown in FIG. 9. For clarity's sake only the properties "dirtiness", "dog-ears" and "stains" were used from the properties of the first embodiment. In this example the measuring results of the sheet material can assume values between 0 and 1. Three overlapping classes are assigned to each property. For the property "dirtiness" these are the classes "high" with measuring results in the interval from 0 to 0.5, "medium" in the interval from 0 to 1, and "low" in the interval from 0.5 to 1. The classes "high", "medium", "low" are used as fuzzy classes in the following.

Each fuzzy class is assigned an affiliation function shown in FIG. 9. The number of overlapping fuzzy classes and the form of the different affiliation functions can be fixed at will. By suitable choice of the affiliation functions one can optimize the functionality of the method for the particular application.

In FIG. 9 the measuring results of two measurements, $M_1$ and $M_2$, are plotted with the affiliation values resulting from the affiliation functions. Measurement $M_1$ involves a bank note with low dirtiness, relatively many dog-ears and few stains. In measurement $M_2$ the dirtiness is greater than in measurement $M_1$ and it has more dog-ears. Further, it shows fewer stains than measurement $M_1$.

The fuzzy classes are used to define a rule matrix shown in FIG. 10. In the columns of the rule matrix the possible combinations of the individual classes of the properties "dirtiness", "dog-ears" and "stains" are plotted. The last column of the rule matrix is a property "sorting" with three fuzzy classes designated "stacker", "shredder" and "reject". The rows of the rule matrix show rules 1 to 8 which each associate a possible combination of fuzzy classes of the three properties to a fuzzy class of the property "sorting". Under the particular designation of the fuzzy class the affiliation value determined in FIG. 9 is stated for measurements $M_1$ and $M_2$. The determination of the values stated for the fuzzy classes of the property "sorting" will be explained in the following.

Verbally the rules of the rule matrix can be stated as follows. Rule 1 says for example that a bank note with low dirtiness, many dog-ears and few stains is to be assigned to the fuzzy class "reject" of a property "sorting". According to rule 2 a bank note with medium dirtiness, many dog-ears and few stains is assigned to the fuzzy class "shredder" of the property "sorting", etc. The rule matrix is limited to eight rules here since no other reasonable combinations occur with measurements $M_1$ and $M_2$. However, it is basically unnecessary for the rule matrix to contain rules for all possible combinations. It suffices for it to contain merely rules for relevant combinations.

For deriving a sort class of a bank note, a corresponding affiliation function is first also associated to each fuzzy class of the property "sorting", as shown in FIG. 11.

From the fuzzy classes with their affiliation functions and the rule matrix, the resulting fuzzy classes "stacker", "shredder", "reject" of the sorting are first derived by means of a so-called inference machine.

One obtains the fuzzy classes of the property "sorting" resulting from the rules by first linking together the corresponding affiliation values of the measuring results within a rule and associating the result of linkage to the sorting, as shown in FIG. 10. The selection of the smallest affiliation value was selected here as a simple case for linkage (framed in each case).

Figure 12A:
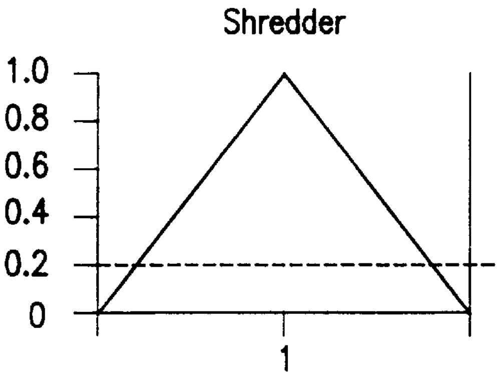
Figure 12B:
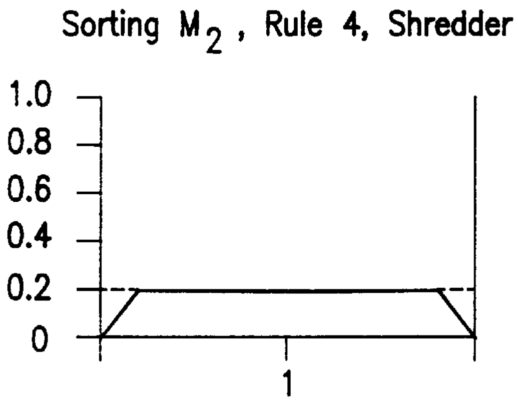
Figure 12C:
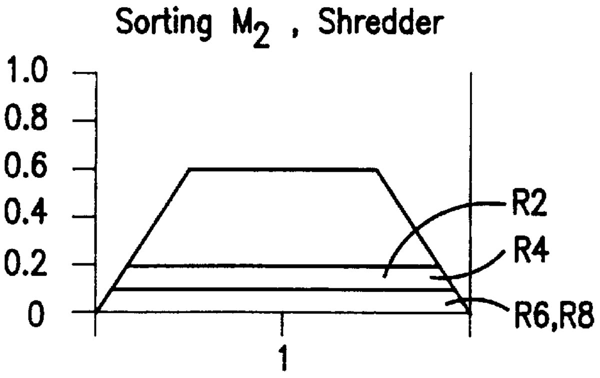

FIG. 12 shows by way of example the fuzzy class "shredder" of the property "sorting" resulting from the corresponding rules. The affiliation function of the fuzzy class "shredder" is cut off at the corresponding height according to the result of the linkage in the rule. FIGS. 12*a* and 12*b* show this process for the results of measurement $M_2$ of rule 4. According to the rule matrix shown in FIG. 10, rule 4 delivers the value 0.2 for measurement $M_2$ and the fuzzy class "shredder" of the property "sorting". Consequently the affiliation function of the fuzzy class "shredder" is cut off at the value 0.2. The thus obtained portions of the individual rules are linked together. For simplicity's sake the maximum covered area of the individual partial areas was selected as the linkage here. The result of the linkage is shown in FIG. 12*c*.

Figure 13A:
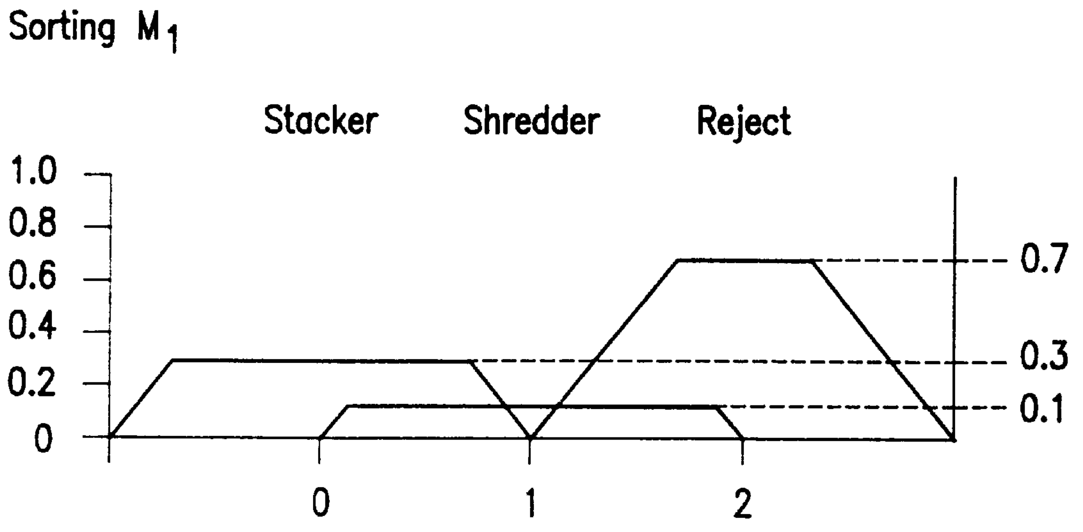
Figure 13B:
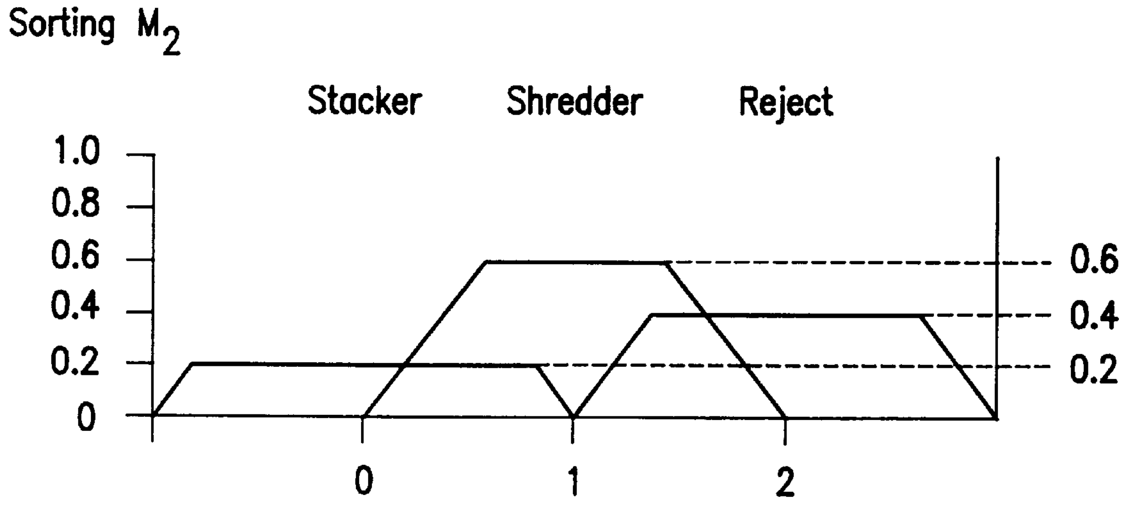

Performing the analogous method for all fuzzy classes of the property "sorting" and all rules, one obtains for measurement $M_1$ and measurement $M_2$ the resulting fuzzy classes of the property "sorting" shown in FIGS. 13*a* and 13*b* with their affiliation functions. The result determined by way of example in FIG. 12*c* is found again here in FIG. 13*b*.

In a last step, a discrete sort class must be derived from the resulting fuzzy classes of the property "sorting", or the property "sorting" defuzzified. A simple way of performing such a derivation is to assign the sort class to the sheet material whose fuzzy class has the greatest area. For the case of measuring results $M_1$ the sheet material would thus be assigned the sort class "reject" and the sheet material with measured values $M_2$ the sort class "shredder".

A more elaborate method for deriving the sort class from the resulting fuzzy classes of the property "sorting" is for example first to link the individual resulting fuzzy classes "stacker", "shredder", "reject" of the property "sorting" with each other for example by combination and to calculate the position of the mass center from the resulting area. By rounding, this value can be mapped on a discrete sort class.

It is of course possible to transfer other ways of dealing with fuzzy logic known from the prior art to the problem of processing sheet material in the above-described sense.

As in the first embodiment of the method, it is also possible to provide the individual rules with security levels here. It is also possible to use weights for each class for example by linking the particular affiliation function of a fuzzy class with the corresponding weight, for example by multiplication. The security level and weights can be treated as in the first embodiment.

We claim:

1. An apparatus for processing sheet material such as bank notes having a singler unit for singling the sheet material from a stack sheet for sheet, a transport unit for transporting the singled sheets through the apparatus, a plurality of sensor units each having a measuring unit and an evaluation unit for determining measuring results for each sheet, a central evaluation unit for assigning a certain destination unit to each sheet using the measuring results from the sensor units, a plurality of destination units in which sheets are stacked or destroyed, a control unit for controlling and/or logging the processing operation on the sheets, and a connection for data exchange between the units, characterized in that at least one sensor unit (20.n) is provided with a memory in which at least one data record is managed, said data record being provided with at least one area (ED) in which data from at least one other sensor unit can be stored.

2. The apparatus of claim 1, characterized in that data records of a plurality of sheets are managed in the memory of at least one sensor unit (20.n).

3. The apparatus of claim 1, characterized in that the memory of the sensor unit (20.n) is provided in the evaluation unit (22.n) of the sensor unit (20.n).

4. The apparatus of claim 1, characterized in that each data record is provided with areas (MD, ME) in which the measuring data determined by the measuring unit of the sensor unit (20.n) and/or the measuring results determined by the evaluation unit of the sensor unit (20.n) can be stored.

5. The apparatus of claim 1, characterized in that the central evaluation unit (10) is provided with a memory in which data records of a plurality of sheets are managed, each data record being provided with areas (ME) in which the measuring results of the sensor units (20.1–20.N) for a certain sheet can be stored.

6. The apparatus of claim 5, characterized in that the central evaluation unit is provided with a memory in which freely configurable tables and/or matrixes are managed which are used for deriving a sort class of a sheet.

7. The apparatus of claim 5, characterized in that means are provided for deriving a sort class for a certain sheet from the measuring results of the sensor units for this sheet.

8. The apparatus of claim 5, characterized in that each data record is provided with an area (SK) in which a sort class of the sheet can be stored.

9. The apparatus of claim 1, characterized in that the transport unit (30) has a plurality of decentralized subunits (30.1–30.M).

10. The apparatus of claim 9, characterized in that each subunit (30.1–30.M) controls a partial portion of a transport path of the transport unit (30).

11. The apparatus of claim 9, characterized in that each subunit (30.1–30.M) controls a certain unit of the apparatus.

12. The apparatus of claim 1, characterized in that the connection for data exchange (100) is a data bus.

13. The apparatus of claim 12, characterized in that the data bus is a CAN bus.

14. The apparatus of claim 12, characterized in that further connections (101, 102) at least partly connecting the units are disposed in parallel to the connection for data exchange (100).

15. The apparatus of claim 14, characterized in that the further connections (101, 102) are data buses.

16. A method for processing sheet material such as bank notes, characterized in that a first sensor unit performs a measurement on the sheet material to obtain measuring data, at least a second sensor unit also performs a measurement on the sheet material to obtain external data, the external data is transferred to the first sensor, and the first sensor unit derives at least one measuring result based not only on the measuring data but also on the external data transferred form the at least second sensor.

* * * * *